Feb. 17, 1959 K. W. PFLEGER 2,874,227

ULTRA-LOW PASS FILTER

Filed Nov. 29, 1954 2 Sheets-Sheet 1

INVENTOR
K. W. PFLEGER
BY Robert J. Fluskey
ATTORNEY

Feb. 17, 1959 K. W. PFLEGER 2,874,227
ULTRA-LOW PASS FILTER
Filed Nov. 29, 1954 2 Sheets-Sheet 2

INVENTOR
K. W. PFLEGER
BY Robert J. Fluskey
ATTORNEY

United States Patent Office 2,874,227

Patented Feb. 17, 1959

2,874,227

ULTRA-LOW PASS FILTER

Kenneth W. Pfleger, Arlington, N. J., assignor to Bell Telephone Laboratories, Incorporated, New York, N. Y., a corporation of New York Application November 29, 1954, Serial No. 471,685

9 Claims. (Cl. 179—100.2)

This invention relates to electrical transducers of the type which are known in the art as transversal filters.

The behavior of electrical networks can be specified in two ways representing two different physical points of view. One is the well-known steady-state point of view which describes the network performance in terms of the concepts of amplitude and phase response versus frequency. In addition to this conventional viewpoint, there is the time function viewpoint in which the network is described in terms of its amplitude-time response at the receiving end resulting from the application of an impulse of infinitesimal duration at the sending end. Network response may thus be considered in terms of frequency or time functions. The bridge between these two avenues of approach is the Fourier integral which may be thought of as a mathematical device for expressing a time function in terms of steady-state phenomena.

In general, prior art practice has been to base the design of communication networks upon the steady-state frequency amplitude characteristics and an elaborate theory has been developed for such design procedures. The networks thus obtained contain as elements, resistances, inductances and capacitances, the frequency and/or phase selective effects of which are used in various combinations to secure desired response characteristics.

When, however, network design is considered from the time function point of view, that is, when time rather than frequency is taken as the independent variable, there develops a broad group of selective circuits whose principle of operation does not depend upon resonant combinations of network elements.

Selective circuits embodying the time function concept have been disclosed in Patents 2,024,900, December 17, 1935, 2,124,599, July 26, 1938 and 2,128,257, August 30, 1938 to N. Wiener and Y. Lee; 2,575,393, November 20, 1951 to L. C. Peterson and R. K. Potter; 2,531,642, November 28, 1950 to R. K. Potter, and elsewhere in the art.

It is an object of this invention to provide certain improvements in the art of modifying given functions of time in accordance with desired patterns of amplitude, frequency and phase variation.

A more specific object of this invention is to utilize magnetic recording and reproducing techniques and apparatus in a novel structure for modifying an impressed electrical input in accordance with a preselected weighting function.

As is already known in the art, transversal filters substitute the time-function approach for the conventional steady-state approach in the simulation of network response, operating through a series of steps which include the following:

(1) Recording or storing the input signal, i. e., the signal or wave to be filtered;

(2) Delaying and weighting the stored record in accordance with a predetermined multiplying function; and (3) Integrating the delayed and weighted increments of the record to produce a modified output.

Such filters utilizing a magnetic recording and reproducing system are known in the art. The function to be filtered is recorded on a magnetic carrier or tape which is subsequently passed through a reproducing system having a plurality of spaced pick-up points. The amount of pick-up is varied from point to point over the pick-up interval in accordance with a predetermined weighting function; and the weighted increments of current from the respective points are continuously summed to produce the desired filtered output current. Such a filter is exemplified by the above-noted Patent 2,531,642 to Potter.

The present invention contemplates a transversal filter comprising, in general, a magnetic recording and reproducing system as in Potter, but involving a different structural organization of components and relying on a part or portions of the magnetic material components to effect the desired weighting of stored record rather than upon transducing coils of particular configurations.

In accordance with one system of the present invention, a magnetic recording ribbon, tape or wire is progressively moved past a magnetic recording device which is connected to a source of signal to be filtered. As the ribbon so moves, successive magnetic records are made therein corresponding to the successive conditions of the signal at the time and point of recording. The magnetic reproducing device includes a core comprising a multiplicity of alternate laminations of magnetic and nonmagnetic material, the core being divided into two portions or sections and including two elongated air-gaps with a reproducing coil disposed on the core in flux-linking relation to the laminae and intermediate the elongated gaps in the core. The number of laminations of magnetic material may be very great, that is, of the order of hundreds or of thousands. The recording ribbon is disposed for movement relative to and against the laminations lengthwise of the core and so as to provide a magnetic path across one of such elongated gaps between opposed laminations in the core; hence, as the ribbon with its records of successive conditions of the signal moves over successive opposed pairs of the magnetic laminae, magnetic flux corresponding to the magnetic condition of the record will be successively induced in the successive pairs of magnetic laminae. A rotatable member, either of a magnetic material or constructed of alternate laminations of a magnetic and of a nonmagnetic material, is disposed in the second of the elongated gaps in the core. If the rotatable member or rotor is laminated, the number and relative disposition of the laminae correspond to those in the core. The rotor preferably includes a plurality of evenly displaced tooth or other portions extending lengthwise of the rotor and of the respective gap. The rotor is disposed to move under control of the driving means provided for the progressive movement of the magnetic ribbon and, in rotating relative to the laminae forming the second gap, produces cyclical variations in the reluctance of the magnetic flux paths through such laminae and the rotor, thereby augmenting the effect of the generally limited or small amount of flux induced in the laminations by the magnetic ribbon.

Control of the magnitudes, or weighting in accordance with transversal filter theory, of the individual voltage contributions in the reproducing coil and therefore to the output wave, that is, control of the filtering action by the system, may be provided for, in accordance with this invention, in a number of ways. The height or the shape of the tooth portions of the rotor may be varied along the length of the rotor. Or, either or both of the air gaps, that is, the one adjacent the recording ribbon and the one in which the rotor is positioned, may be varied along the lengthwise dimension of the reproducing device, as, for example, by shaping or bending the magnetic laminations. Or, neither the rotor nor the laminations need be adjusted, bent or trimmed, but a magnetic shunt be applied to the core sections and so shaped with reference thereto as to vary the reluctance of the magnetic path between individual pairs of magnetic laminations along the length of the reproducing device. Control of the phases of the individual voltage contributions to the output wave due to the flux variations in individual magnetic laminations, may be effected by locating individual laminations of the rotor, if of a toothed, laminated construction, out of phase, that is, shifted, for example, 45 degrees, with respect to other laminations of the rotor.

A more complete understanding of this invention will be derived from the detailed description that follows hereinafter, taken in conjunction with the appended drawings in which.

Figure 1:
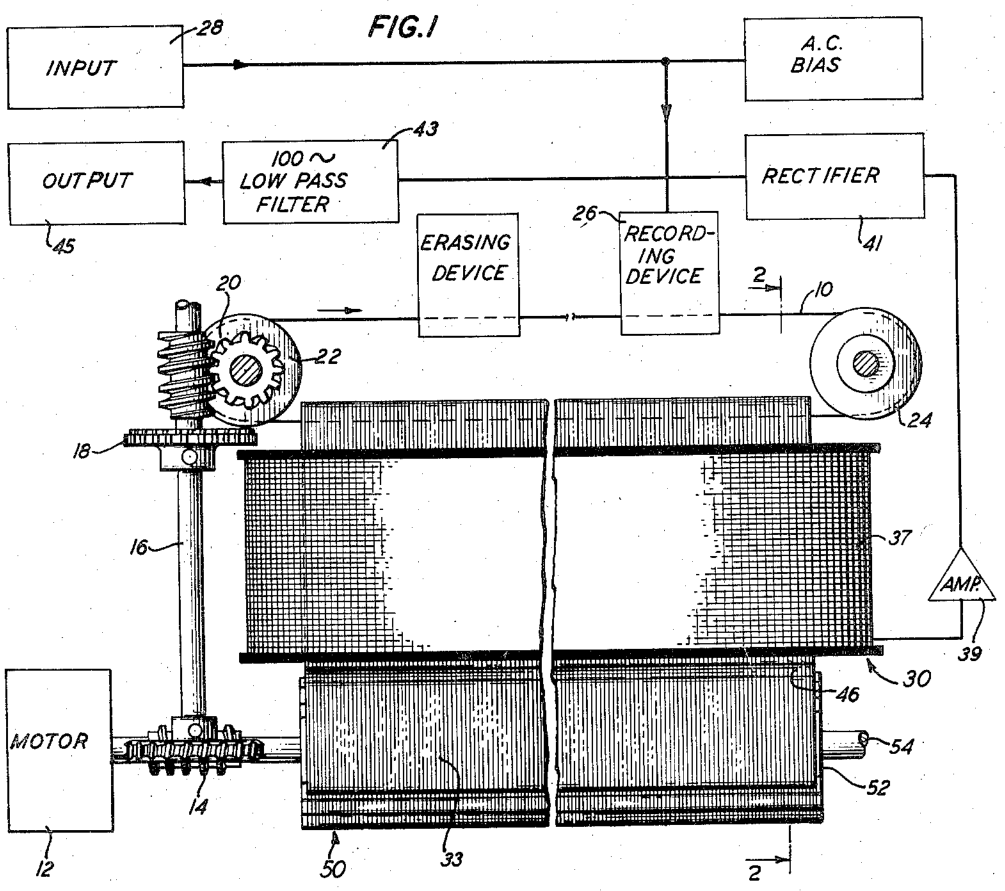
Fig. 1 is a side elevational view of a transversal filter of ultra low-pass type, showing also typical input and output circuit components that might be associated therewith.
Figure 2:
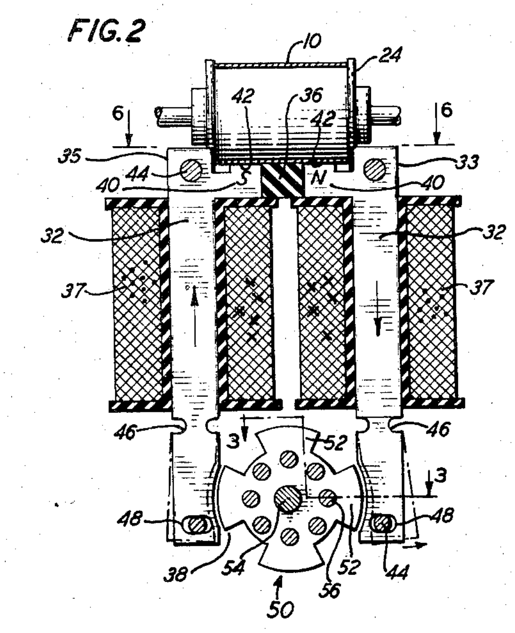
Fig. 2 is a cross-sectional view of the device of Fig. 1, taken along the line 2—2 thereof and illustrating one arrangement for obtaining the desired weighting of stored record in accordance with this invention.
Figure 4:
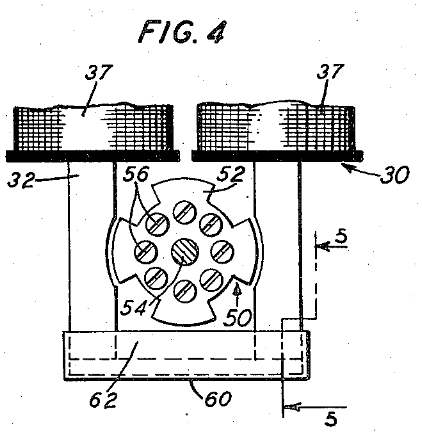
Figure 5:
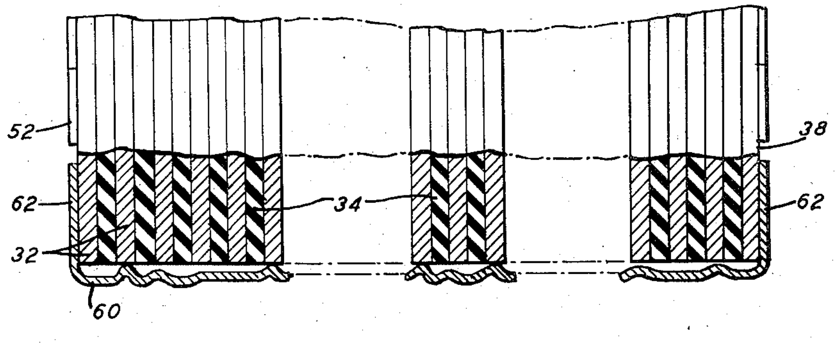
Figure 6:
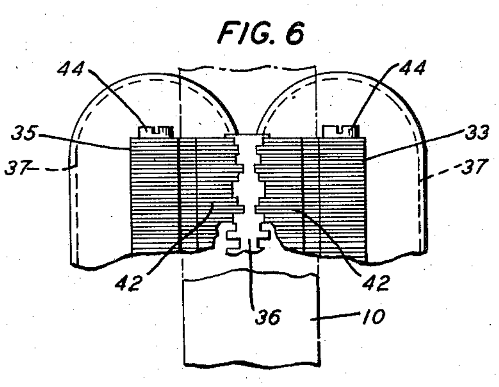

Fig. 4 is an end view of a portion of a modification of the device of Figs. 1 and 2, and Fig. 5 is an enlarged cross-sectional view taken along the line 5—5 of Fig. 4, illustrating another structural arrangement for effecting the desired weighting in accordance with the invention; and Fig. 6 is a plan view of a portion of the device of Figs. 1 and 2, taken along the line 6—6 of Fig. 2, illustrating still another arrangement by which the desired weighting in accordance with the invention may be obtained.

The transversal filter of the drawings comprises an endless magnetic record carrier, tape, ribbon or wire 10 driven by any suitable driving means, for example, the motor 12, through suitable gearing and shafting 14, 16, 18, 20, the record tape passing over the driving pulley 22 and idler pulley 24 at constant velocity. To simplify the disclosure, all shaft bearings have been omitted. The record carrier may be of any suitable material, preferably one adapted to be uniformly coated or impregnated with magnetic material. An electromagnetic recorder or recording device 26 is disposed in transducing relation adjacent the upper outer surface of the magnetic carrier in the region in which the carrier approaches the idler pulley. The recording device is connected to a source 28 of electrical signal. This electrical signal is to be filtered in its transmission through the transversal filter of the invention, and, for purposes of illustration, may consist of a very low frequency signal wave including undesirable signal content, for example, noise, of frequency or frequencies close to that of the signal wave and of such low order as not to permit the use of any simple electrical filter to separate such undesirable signal content from the signal wave. For example, in a particular envelope delay measuring and recording set in which the delay indicating current is a slowly varying direct current fed to the indicating meter or recording device of the set, the interposition of a filter just ahead of such indicating meter or recording device and having a cut-off at somewhere between .003 and .0155 cycle per second in order to reduce random noise reaching the indicating meter or recording device, has been considered desirable. As the magnetic carrier moves progressively under control of the driving means in transducing relation to the recording device, the magnetic material in such carrier is magnetized along its surface transversely to the direction of motion of the carrier, the successive magnetic records in the carrier corresponding to the successive conditions of the signal input from the electrical source at the time and point of recording.

The transversal filter also comprises an electromagnetic reproducer or reproducing device 30. This device includes a core of a large number of thin alternately assembled laminations 32, 34 of magnetic and non-magnetic material, respectively, the core being divided into two substantially L-shaped sections or portions 33, 35 so as to provide or define two elongated air gaps 36, 38 extending lengthwise of the core, that is, in the direction of motion of the magnetic carrier. The gap 36 is formed by the opposed extending portions 40 of oppositely disposed laminations in the core sections, and a magnetic flux path between each opposed pair of the laminations of magnetic material is completed through the magnetic carrier which preferably is so disposed as to be progressively moved over the upper edges or surfaces 42 of the laminations in sliding or frictional contact therewith, as indicated more clearly in the cross-sectional view of Fig. 2. Hence, as the magnetic carrier with its records of successive conditions of the electrical signal input moves over successive opposed pairs of the magnetic laminae, magnetic flux corresponding to the magnetic condition of the carrier will be successively induced in the successive pairs of magnetic laminae.

Each lamination of magnetic material is thin and, although not shown in proportion in the drawings, may be of the order of .001 inch in thickness, with the interposed spacers or laminations of non-magnetic material of the same order of thickness. Each core portion may comprises hundreds or even thousands of these laminations suitably fastened together, for example, by bolts 44 of non-magnetic material, into a single solid member. Each core section 33, 35 is surrounded by a winding 37 located intermediate the gaps 36, 38 and the windings are connected in series aiding to the input of an electrical wave amplifier 39. In the cross-sectional view of Fig. 2, when the magnetic flux has the direction shown by the arrows, the wires having current leaving the plane of the paper are indicated as dots and those having current entering the plane of the paper are indicated as crosses. The output of the amplifier is shown connected through a rectifier 41 and a conventional low-pass filter 43 of simple electrical type to a utilization circuit or device 45. For a purpose to be explained at a later point in this description, the magnetic laminations may be provided with a portion of reduced section, for example at 46, and a suitably elongated slot or hole 48 for the lower of the fastening devices 44, so that the lower end portions of one or more of such laminations may be adjusted or bent in position, as indicated by the dotted line, so as to change, lamination by lamination if desired, the cross-dimension of the gap 38.

The gap 38 contains a rotatable member or rotor 50 extending lengthwise of the gap, and including a plurality of evenly displaced projecting, ridge or tooth portions 52 extending lengthwise of the rotor and of the gap. The rotor is adapted to be rotated, as indicated, under control of the driving means 12, and, in rotating relative to the laminae forming the gap 38, to produce cyclical variations in the reluctance of the magnetic flux paths through such laminae and the rotor, thereby periodically increasing and decreasing the effect of the generally limited or small amount of the flux induced in the laminations by the magnetized carrier. The velocity of movement of the magnetic carrier ordinarily will not be of high order, for example, of the order of about one inch per minute. By appropriate selection of gearing intermediate the driving means 12 and the magnetic carrier and the rotor, the latter may be caused to rotate at a desired relatively high number of revolutions per minute; if, for example, this should be selected as of the order of 1800 revolutions per minute, and the rotor has four longitudinally extending ridges or teeth as shown, the cyclical variations in flux introduced thereby would be at the rate of 120 cycles per second. The rotor 50 may be a single solid member of magnetic material mounted on a rigid non-magnetic motor shaft 54, or it may be made of alternate laminations of magnetic and non-magnetic material in number similar to that of each core section, suitably fastened together, as by bolts 56 of non-magnetic material, and mounted securely on the shaft 54. Although the use of the single solid member may contribute to a more economical structure, the laminated rotor structure permits of the use of a greater variety of filter characteristics as will be developed in greater detail hereinafter.

The flux induced in a particular lamination will be substantially proportional to the slowly varying magnetomotive force in the successive portions of the magnetic carrier that come in contact with the particular lamination. Since the carrier or tape moves slowly, for example, at a rate of about one inch per minute, only negligible voltage would be induced in the windings of the reproducing coil, were it not for the toothed rotor which, as pointed out, varies the reluctance of the path through each opposed pair of magnetic laminations at a rapid rate. As a result of the latter, appreciable voltage can be induced in the windings 37. The total voltage impressed on the amplifier 39 is the resultant of the effects due to each pair of magnetic laminations. The larger the number of such voltage contributions closely spaced, the closer is the effect obtained of a substantially continuous pick-up of the stored signal on the carrier and the farther apart in frequency are the spurious pass-bands which occur due to use of a finite number of pick-ups. For example, it is estimated, based on experiment, that if a transversal filter has a useful pass-band of .03 cycle per second and if as many as 7100 laminations of magnetic material are assembled in each core section, the spacing between suprious pass-bands would be of the order of about 130 cycles per second; hence the low-pass filter 43 need have a cut-off only of about 100 cycles per second, which would also eliminate pulsations due to the rotor.

Figure 3:
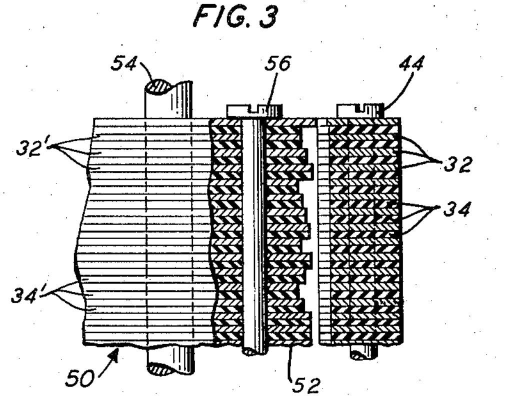
Fig. 3 is a cross-sectional view, not to scale, of a portion of an embodiment of the device of Fig. 1 taken along the line 3—3 of Fig. 2, illustrating another arrangement for effecting the desired weighting of stored record in accordance with the invention.

The suitable weighting in the reproducing device in accordance with transversal filter theory may be accomplished for each separate pair of opposed magnetic laminations by adjustment of its magnetic path reluctance. One method is to adjust air gaps between the teeth or ridges of the rotor and the laminations 32. One way in which this may be done is as follows: A rotor initially having uniform tooth or ridge height throughout its length is mounted as shown in the drawings. The carrier or tape 10 is removed and a thin, needle-like permanent magnet is placed on the pick-up surfaces 42 of a particular pair of magnetic laminations. Then using a cutting tool, as the rotor is caused to rotate, the height of each tooth or ridge is reduced in the region thereof opposite the particular pair of laminations until the output of the reproducing device is down the desired number of decibels with respect to a maximum value prior to the cutting or trimming operation. In this manner, the rotor is shaped at each point along its length corresponding to a pair of magnetic laminations so as to give the desired amplitude contribution in the reproducing coil for each such pair of laminations. If at any point, the rotor ridge is cut away completely, there would be substantially zero pick-up in the coil due to the laminations corresponding to that point. Fig. 3 is a representation of such an adjusted laminated ridge or tooth and associated core laminations, the proportions not being to scale in order to emphasize the variation in spacing between correspondingly located laminations 32, 32' and 34, 34' in the core sections and in the rotor.

When the rotor is assembled of alternate laminations of magnetic and non-magnetic material and the ridges or teeth are sinusoidal, instead of substantially rectangular as shown in the drawings, certain of the laminations may be displaced by mounting them 45 degrees with respect to the others. Then tooth portions occur where spaces had been and vice versa. The voltages generated in the reproducing coil by the displaced laminations will be 180 degrees out of phase with respect to those generated by the other laminations and will add in phase opposition in the coil windings. This sort of phase shift gives the effect necessary to simulate a filter whose response due to an impulse has oscillations with sign reversals. In the case of such sinusoidal configuration for the teeth or ridges, their effects would be interfered with if they were cut or trimmed for weighting purposes, and the adjustment in the air gap would be accomplished by means described hereinafter.

When the input electrical signal (i. e., desired signal wave plus random noise) is predominantly unidirectional so that the desired output wave when filtered never changes sign, the amplifier 39 may be arranged to feed its output into a linear rectifier 41. If, however, the desired output wave is supposed to change sign ever, the linear rectifier could be replaced by a homodyne detector. The local carrier for this detector would be 120 cycles per second from a generator (not shown) that could be connected to the shaft 54, in phase with the 120 cycles per second pulsations in the amplifier during positive outputs therefrom.

It is desirable that the magnetic carrier or tape shall pass over the pole faces 42 of each lamination without appreciable wear while at the same time wiping them closely. Therefore, the surfaces of these pole faces, the non-magnetic laminations or spacers and the solid non-magnetic spacer member occupying the gap 36, on which the tape wipes, should be highly polished. To hold the tape flat against the pole-pieces, a long flat polished horizontal shoe, not shown, could be provided within the space between the pulleys 22, 24 so as to bear against the inner side of the tape as the latter moves through the reproducing device.

In most laminated magnetic core structures, the separation between the laminations of magnetic material is merely for the purpose of reducing eddy currents, and might be provided by a very thin coating of a cement. In the system herein disclosed, it is also desired to secure a certain amount of magnetic separation between laminations. In an ideal case there would be no flux leakage from one pair of laminations to another. In actual practice, however, this ideal will not be attained although departure from it could be minimized by increasing the thickness of the spacers or alternate laminations of non-magnetic material. Since the nature of the recorded electrical signal input will be such as usually to produce a slowly varying magnetomotive force along the tape, the will be little difference between the flux in adjacent magnetic laminations and little tendency for flux leakage. The error, if any, introduced by such leakage should be of negligible order when the alternate magnetic and non-magnetic laminations are of about equal thicknesses.

In accordance with conventional magnetic recording technique, the transversal filter system described may include an erasing device for restoring the magnetic carrier to a non-magnetized condition after the portion on which signal input has been stored by the recording device has traversed the reproducing device and, having passed over the pulley 22, approaches the recording device, whereby a tape of moderate proportions may be utilized for an extended filtering operation. Likewise, in accordance with conventional magnetic recording technique, a high frequency biasing current may be impressed on the recording device simultaneously with the electrical signal input.

Another method of varying the spacing between the rotor teeth and the laminations of the core sections to accomplish the desired weighting of the contributions of the individual magnetic lamination pairs to the induced voltage in the reproducing coil, in which cutting or trimming of the rotor is unnecessary, will now be described with reference to the reduced-section portions 46, Fig. 2, of the laminated core sections. The portions 46 of reduced section and the slots 48 permit the individual laminations to be adjusted or bent toward or away from the rotor. If the adjustment of the laminations requires a displacement greater than reasonably sized slots would allow, the lower fastening devices 44 could be removed and flanking plates (not shown) at the ends of the core sections could be secured together using bolts extending below the lower ends of the laminations, thus holding the adjustment fixed. Of course, the laminations could be made longer than shown, that is, below the portions of reduced section, with the rotor located farther below the reproducing coil than shown. In such event, a very small bend or adjustment at the portions 46 would result in a large displacement at the ends opposite the rotor teeth.

Another arrangement to control the amount of pickup along the lengthwise dimension of the reproducing device, if it is desired to leave the rotor and the laminations adjacent thereto unaffected, is to vary the reluctance across the gap 36 by cutting or trimming opposed pairs of laminations. This practice is illustrated in Fig. 6.

An alternative to cutting or trimming the rotor, or the opposed pairs of laminations of the gap 36, or to bending or adjusting the laminations where adjacent the rotor, is to add a magnetic yoke to the structure, which yoke would function to shunt the magnetic path between opposed pairs of laminations in the core sections and whose shunting effect would be adjustable over the lengthwise dimension of the reproducing device.

Such a magnetic shunt could be readily applied when the core sections are constructed so that the lower ends thereof extend below the rotor, as illustrated in Figs. 4 and 5. The magnetic shunt comprises a thin plate member 60 of magnetic material having angle portions 62 adapted to engage the ends of the core sections 33, 35, a fragment of only one of which is shown in Fig. 5. The plate is bent or otherwise shaped or "rippled" to provide the desired varying distances lengthwise of the plate and the laminations of the core sections so as to effect the desired weighting of the contributions of the individual pairs of laminations to the voltage induced in the reproducing coil. The pairs of laminations with which the plate makes contact are short-circuited magnetically, while those from which the plate is spaced are short-circuited magnetically to a degree dependent on the spacing, the greater the separation, of course, the less the short-circuiting effect of the plate. It will be evident that this expedient also offers a means for readily obtaining a variety of filter characteristics inasmuch as shunting plates of differing contours along the lengthwise dimension of the core sections may be made available for substitution for one another. Although involving some complication in structure, it would be possible to form a flexible magnetic shunting plate the irregularities in which for shunting purposes are controlled by micrometer screw adjustments held firmly in place by lock nuts (not shown).

The axial or lengthwise play of the rotor should be negligible in the case of ridges or teeth having adjusted heights. When, however, the weighting is accomplished by adjusting the reluctance at the gap 38 by bending the laminations with respect to the rotor or by utilizing the magnetic shunting plate, axial play of the rotor is not significant except where one or more parts of the rotor have teeth shifted 45 degrees as noted hereinabove. In the latter situation, axial play should be severely limited. The use of a worm gear, as shown, near the motor 12, tends to reduce any such axial play.

Although this invention has been disclosed with reference to a specific structural embodiment and certain variations therein, it will be evident to the skilled in the art that the invention is not restricted in scope thereto but is capable of other embodiments without departing from the spirit of the invention.

What is claimed is:

1. In a magnetic recording-reproducing system, in combination, a magnetic recording tape, an electromagnetic recording device, driving means to progressively move said magnetic recording tape in transducing relation to said recording device, an electrical signal source, said recording device being coupled to said signal source whereby magnetic records of said signal corresponding to successive conditions of said signal are impressed on said recording tape by said recording device successively in adjacent regions along the tape in its direction of motion, but with lines of force running transversely to the direction of motion, an electromagnetic reproducing device disposed to respond to the magnetic records of said tape, said reproducing device including a core comprising a large number of thin laminations of alternately magnetic and non-magnetic material, said laminations being perpendicular to the direction of motion of the tape, said core including a pair of elongated gaps which cut a plurality of said laminations transversely, said reproducing device constituting a multiplicity of reproducer units located in adjacent succession in the direction of motion of the tape whereby each transversely magnetized region of the tape passes over each of said reproducer units to produce signals from the tape simultaneously at its various successive transversely magnetized regions distributed along the length of the tape in the direction of its motion, some at least of said reproducer units having different magnetic reluctances varying along the length of said reproducing device in accordance with a predetermined weighting function, said driving means being disposed to move said recording tape progressively in transducing relation to the first one of said gaps in said reproducing device and in a direction parallel to the long dimension of said one gap, a reproducing coil for said multiplicity of reproducer units disposed in flux-linking relation to the magnetic laminations of said core and surrounding said core intermediate said elongated gaps, and an output circuit in energy transfer relation with said reproducing coil.

2. A system in accordance with claim 1 in which a rotor member is disposed within the second of said elongated gaps of said core and driven by said driving means to cyclically vary the reluctance of the path through individual pairs of the magnetic laminations of said core, and in which some at least of such magnetic laminations are adjustable in position where adjacent to such rotor member to provide said different reluctances.

3. A system in accordance with claim 1 in which a rotor member comprising alternate laminations of a magnetic material and a non-magnetic material is disposed within the second of said elongated gaps in said core and driven by said driving means relative to the laminations forming said second gap to cyclically vary the reluctance of the path through individual pairs of the magnetic laminations of said core and in which two or more of the laminations of said rotor are in respectively different relative spacing from magnetic laminations of said core correspondingly located lengthwise of said second gap.

4. A magnetic transducer comprising in combination a hollow core comprising a stack of alternately magnetic and non-magnetic laminae having two gaps therein extending through said laminae lengthwise of said stack and dividing the core into two portions, said stack of laminae constituting a multiplicity of magnetic reproducer units located in adjacent succession, a magnetic recording tape bearing a signal record in the form of adjacent regions along the tape in its direction of motion which are magnetized transversely to said direction, said laminae being perpendicular to said direction, said core being disposed with the laminae forming one of said gaps in transducing relation with said magnetic tape and extending in said direction, driving means disposed for progressively moving said tape in transducing relation with the laminae of said one gap so that each transversely magnetized region of the tape passes over each of said reproducer units to produce signals from said tape simultaneously at its various successive transversely magnetized regions distributed along the length of said tape, a rotatable magnetic member disposed in the second of said gaps in spaced relation to the laminae forming said second gap, the spacing of said rotatable member and said laminae varying along the length of said core, and a reproducing coil disposed on said core in flux-linking relation to said laminae and intermediate the elongated gaps in said core.

5. A magnetic transducer as claimed in claim 4 in which the variable spacing between said rotatable member and the laminae of the respective gap is determined by variation in contour of said member lengthwise thereof.

6. A magnetic transducer as claimed in claim 4 in which the variable spacing between said rotatable member and the laminae of the respective gap is determined by the positions of adjustable portions adjacent said rotatable member of some of said laminae.

7. A filter system comprising an input circuit, an output circuit, a magnetic recorder and a magnetic reproducer disposed at spaced points along a movable magnetic record carrier in wave transducing relation therewith, said recorder being adapted to record at respectively successive points along the length of said magnetic record carrier whereby an electrical signal appearing in said input circuit is recorded in its successive conditions on successive adjacent portions along said magnetic record carrier in its direction of motion but with lines of force running transversely to said direction, said magnetic reproducer comprises a unitary structure having a multiplicity of distinct spaced magnetic transducing portions arranged in adjacent succession in the direction that the record carrier moves, all coupled to said output circuit through a reproducing coil common to said multiplicity of portions so that the successive adjacent transversely magnetized portions of said record carrier pass over each of said transducing portions in succession for simultaneous production of signals in said transducing portions at points distributed along the length of the record carrier in the direction of its motion whereby the signal reproduced by each transducing portion is in time-displaced relation with the signal reproduced by each of the other transducing portions and is integrated in said common reproducing coil, said transducing portions having different magnetic reluctances varying along the length of said unitary structure in accordance with a predetermined weighting function.

8. A system in accordance with claim 1 which includes a yoke of magnetic material between the ends of the laminations forming the second one of said gaps, said yoke being spaced from the ends of certain of the laminations by different distances to provide the different reluctances in accordance with the weighting function.

9. A system in accordance with claim 1 in which the ends of the opposed pairs of laminations have different spacings across said first gap to provide the different reluctances in accordance with the weighting function.

References Cited in the file of this patent

UNITED STATES PATENTS

| | | |
|---|---|---|
| 2,423,339 | Newman | July 1, 1947 |
| 2,517,808 | Sziklai | Aug. 8, 1950 |
| 2,531,642 | Potter | Nov. 28, 1950 |
| 2,641,656 | Dicke | June 9, 1953 |